J. W. SOHN.
CULTIVATORS.

No. 195,459. Patented Sept. 25, 1877.

UNITED STATES PATENT OFFICE.

JOHN W. SOHN, OF HAMILTON, OHIO.

IMPROVEMENT IN CULTIVATORS.

Specification forming part of Letters Patent No. 195,459, dated September 25, 1877; application filed June 4, 1877.

*To all whom it may concern:*

Be it known that I, JOHN W. SOHN, of Hamilton, in the county of Butler and State of Ohio, have invented a new and useful Improvement in Cultivators; and I do hereby declare that the following is a full and exact description thereof, reference being had to the accompanying drawings, and to the letters of reference marked thereon.

Figure 1:
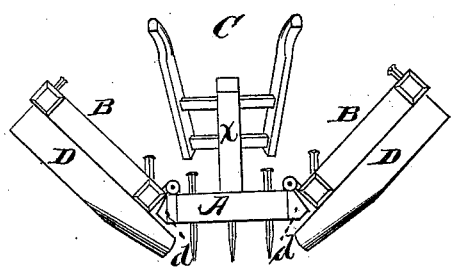
Figure 2:
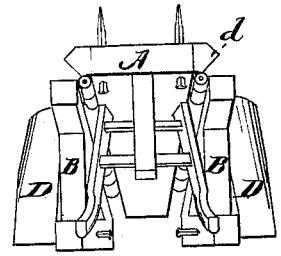
Figure 3:
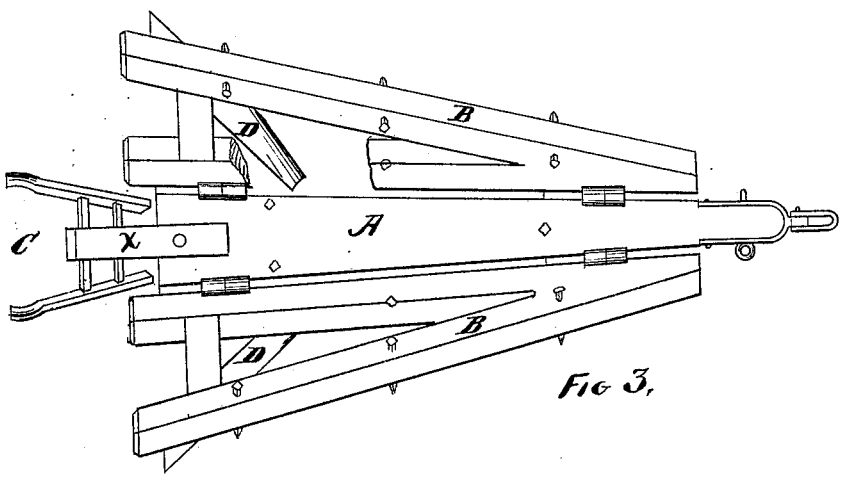

Figure 1 represents a rear elevation of my new cultivator with the hinged wings in the position they will occupy when in use. Fig. 2 represents a similar view of the cultivator reversed in position to be removed to and from the field. Fig. 3 is a plan view of the same.

The object of my invention is to provide an agricultural implement capable of use for cultivating crops that are drilled or planted upon ridges of soil, such as are usually made for planting sweet potatoes and some other vegetables.

I am not aware that any efficient implement has been invented and introduced for this purpose which does not require to be followed by the hand-hoe to replace the soil around the roots of the plants. Neither the plow nor the harrow can be used to cultivate ridged ground without disturbing the integrity of the ridges, or causing them to become partially leveled to the original surface.

My invention consists in the combination and arrangement of hinged wings, convertible to runners, provided with cultivating-teeth, and in the construction and adaptation of curved cutting and elevating blades for the self-adjusting wings, as hereinafter more fully described.

In the accompanying drawings, A denotes the central frame-piece, of tapering form, and B B are the hinged side wings, provided with teeth and curved cutting-blades D. The central frame A is provided with handles C, and is also furnished with teeth.

The part A may be made of any width and shape desired, and the triangular wings, which are free on their hinges within certain limits to adapt themselves to the inclined surfaces of the ridges of soil to be cultivated, are to have their outer front corners rounded off, to serve as runners when the machine is reversed, as shown in Fig. 2, for removal.

In rear of the teeth of the wings the cutting and elevating blades D are secured obliquely by removable screws.

The V-shaped blocks *d* may be secured by removable screws upon the outer sides of the frame A, as represented in Fig. 1. These wedge-shaped blocks *d* can be used interchangeably with others, of any desired dimensions, to serve as stops to limit the downward motion of wings B, and thereby regulate the depth of the work of the cultivator-teeth. This provision of stops to the vibratory action of the wings B will, in some measure, prevent the action of the cultivator-teeth from causing the soil which they disturb in their progress being precipitated to the bottom of the ridge.

An adjustable strap, connecting the wings, and passing over the handle-support X, in reach of the attendant, may be substituted for the stop-blocks *d*.

The principal feature of my improvement consists in the elongated blades D, slightly grooved or concavo-convex longitudinally, and removably attached obliquely under the wings B, in rear of the cultivator-teeth. Their front ends and lower edges are made sharp, or knife-edged, to cut weeds and grass which may grow upon the ridges of soil; and their arrangement and concave form are such as to cause them to act as elevators as the machine progresses, and continually carry the mellowed earth which the cultivator-teeth have loosened upward to the roots of plants upon the central longitudinal line of the ridge, thereby keeping the ridges in their primary integrity.

Instead of the single-fluted cutting-elevators D, a series of similar and shorter devices may be used upon each wing, so arranged relatively to each other as to produce the desired result.

It is found from practical tests that many kinds of plants and vegetables thrive best when planted upon elevated ridges or hills of earth, for the reason that their roots have a larger body of soil beneath in which to grow; but the increased labor of cultivating ridged planting has hitherto discouraged this mode of cultivation of large fields of grain and vegetables.

I have tested my improved cultivator and have found it practical and efficient for the purpose for which it was invented.

When my cultivator is to be used like a harrow, the stops d and blades D may be removed, and a central frame of any desired form and size may be substituted for the frame A. Flukes, shovels, or edged cutters of any known or desired form may be employed in place of the common harrow-teeth; and, under certain circumstances, the wings may be hinged together without the central frame, and operate in substantially the same manner described.

I claim and desire to secure by Letters Patent—

1. The concavo-convex cutting and elevating blades D, arranged obliquely, in combination with the self-adjusting wings B, provided with teeth, substantially as and for the purpose specified.

2. In a cultivator having self-adjusting wings, the combination of cultivating-teeth, obliquely arranged elevators, and stops d, or their equivalents, as and for the purpose specified.

Witness my hand this 29th day of May, 1877.

JOHN WM. SOHN.

Witnesses:
H. P. K. PECK,
J. C. McKENNY.